United States Patent
Zhang (10) Patent No.: US 11,848,773 B2
(45) Date of Patent: Dec. 19, 2023

(54) TRANSMIT ANTENNA SWITCHING METHOD AND TERMINAL DEVICE

(71) Applicant: VIVO MOBILE COMMUNICATION CO.,LTD., Guangdong (CN)

(72) Inventor: Sha Zhang, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 47 days.

(21) Appl. No.: 17/568,092

(22) Filed: Jan. 4, 2022

(65) Prior Publication Data

US 2022/0123857 A1    Apr. 21, 2022

Related U.S. Application Data

(63) Continuation of application No. PCT/CN2020/099717, filed on Jul. 1, 2020.

(30) Foreign Application Priority Data

Jul. 8, 2019    (CN) .......................... 201910609648.1

(51) Int. Cl.
H04L 1/00      (2006.01)
H04W 76/16     (2018.01)
H04L 5/00      (2006.01)

(52) U.S. Cl.
CPC .......... *H04L 1/0025* (2013.01); *H04L 5/0051* (2013.01); *H04W 76/16* (2018.02)

(58) Field of Classification Search
CPC ........ H04B 1/006; H04B 7/061; H04B 7/063; H04L 1/0025; H04L 5/0023;
(Continued)

(56) References Cited

U.S. PATENT DOCUMENTS

2009/0042616 A1* 2/2009 Teo .................. H04B 7/061
                                                  455/562.1
2010/0069028 A1   3/2010 Choi et al.
(Continued)

FOREIGN PATENT DOCUMENTS

CN    101682918 A    3/2010
CN    107707289 A    2/2018
(Continued)

OTHER PUBLICATIONS

Sony, "Summary of SRS", 3GPP TSG RAN WG1 Meeting #94, R1-1809814, Gothenburg, Sweden, Aug. 20-24, 2018.
(Continued)

*Primary Examiner* — Mansour Oveissi
(74) *Attorney, Agent, or Firm* — Price Heneveld LLP (57) ABSTRACT

The present disclosure provides a transmit antenna switching method and a terminal device. The method includes: when the terminal device is in a dual-network connected state, determining a first network used to transmit control plane data and a second network only used to transmit user plane data, where the dual-network connected state is that the terminal device is simultaneously connected to the first network and the second network; determining, based on a transmit antenna used by the first network, a first transmit mode for switching an SRS antenna operating in the second network; and performing the SRS antenna switching based on the first transmit mode by using a first antenna set, where the first antenna set is all antennas used for the dual-network connected state included in the terminal device except the transmit antenna used by the first network.

15 Claims, 4 Drawing Sheets

(58) Field of Classification Search
CPC ... H04L 5/0048; H04L 5/0051; H04L 5/0069; H04W 76/16
See application file for complete search history.

(56) References Cited

U.S. PATENT DOCUMENTS

| | | |
|---|---|---|
| 2011/0098054 A1 | 4/2011 | Gorokhov et al. |
| 2013/0222206 A1 | 8/2013 | Park |
| 2018/0145742 A1 | 5/2018 | Li et al. |
| 2018/0368082 A1 | 12/2018 | O'shea et al. |
| 2019/0074879 A1 | 3/2019 | Furuskog et al. |
| 2020/0052853 A1 | 2/2020 | Qin et al. |
| 2020/0382250 A1* | 12/2020 | Choi ............... H04W 72/21 |
| 2021/0143844 A1 | 5/2021 | Yang |

FOREIGN PATENT DOCUMENTS

| | | | |
|---|---|---|---|
| CN | 109167611 | A | 1/2019 |
| CN | 109361444 | A | 2/2019 |
| CN | 109474291 | A | 3/2019 |
| CN | 109802801 | A | 5/2019 |
| CN | 109861734 | A | 6/2019 |
| CN | 109964418 | A | 7/2019 |
| CN | 110149132 | A | 8/2019 |
| EP | 2452474 | B1 | 2/2016 |

OTHER PUBLICATIONS

Huawei, Hisilicon, "On support of SRS antenna switching for 1T4R and 2T4R antenna configurations", 3GPP TSG RAN WG1 Meeting #92bis, R1-1803957, Apr. 16-Apr. 20, 2018, Sanya, China.

* cited by examiner

TRANSMIT ANTENNA SWITCHING METHOD AND TERMINAL DEVICE

CROSS-REFERENCE TO RELATED APPLICATIONS

The present application is a continuation application of International Application No. PCT/CN2020/099717 filed on Jul. 1, 2020, which claims priority to Chinese Patent Application No. 201910609648.1, filed on Jul. 8, 2019 in China, which are incorporated herein by reference in their entireties.

TECHNICAL FIELD

The present disclosure relates to the field of communications technologies, and in particular, to a transmit antenna switching method and a terminal device.

BACKGROUND

In a development process of a 5th generation (5G) communications system network, two networking manners are used: non-standalone (NSA) and standalone (SA). When a terminal device communicates with a base station in an NSA network, if the terminal device communicates with the base station in a dual-connectivity manner of Long Term Evolution (LTE) and 5G new radio (NR), it is required that an LTE band and an NR band can operate simultaneously.

The terminal device needs to perform transmit antenna switching on the LTE band, to optimize signal quality during signaling connection on the LTE band. In addition, the terminal device needs to perform sounding reference signal (SRS) antenna switching on the NR band, so that the base station learns channel quality of an antenna of the terminal device, and the terminal device also needs to perform transmit antenna switching when performing the SRS antenna switching. Therefore, a conflict exists between the LTE band and the NR band in a transmit antenna switching process, thereby affecting communication quality.

SUMMARY

Embodiments of the present disclosure provide a transmit antenna switching method and a terminal device, to resolve a problem that communication quality is affected by a conflict between an NR band and an LTE band in a transmit antenna switching process.

To resolve the foregoing technical problem, the present disclosure is implemented as follows:

According to a first aspect, the embodiments of the present disclosure provide a transmit antenna switching method, applied to a terminal device and including:

when the terminal device is in a dual-network connected state, determining a first network used to transmit control plane data and a second network only used to transmit user plane data;

determining, based on a transmit antenna used by the first network, a first transmit mode for switching a sounding reference signal SRS antenna operating in the second network; and performing the SRS antenna switching based on the first transmit mode by using a first antenna set, where the dual-network connected state is that the terminal device is simultaneously connected to the first network and the second network;

the first transmit mode includes a quantity of antennas for performing the SRS antenna switching in the second network; and the first antenna set is all antennas used for the dual-network connected state included in the terminal device except the transmit antenna used by the first network.

According to a second aspect, the embodiments of the present disclosure further provide a terminal device, including:

a first determining module, configured to: when the terminal device is in a dual-network connected state, determine a first network used to transmit control plane data and a second network only used to transmit user plane data;

a second determining module, configured to determine, based on a transmit antenna used by the first network, a first transmit mode for switching a sounding reference signal SRS antenna operating in the second network; and a first switching module, configured to perform the SRS antenna switching based on the first transmit mode by using a first antenna set, where the dual-network connected state is that the terminal device is simultaneously connected to the first network and the second network;

the first transmit mode includes a quantity of antennas for performing the SRS antenna switching in the second network; and the first antenna set is all antennas used for the dual-network connected state included in the terminal device except the transmit antenna used by the first network.

According to a third aspect, the embodiments of the present disclosure further provide a terminal device, including a processor, a memory, and a computer program that is stored in the memory and that can be run by the processor, where when the processor executes the computer program, the steps of the foregoing transmit antenna switching method are implemented.

According to a fourth aspect, the embodiments of the present disclosure further provide a computer-readable storage medium, where the computer-readable storage medium stores a computer program, and when a processor executes the computer program, the steps of the foregoing transmit antenna switching method are implemented.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings without creative efforts.

DETAILED DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
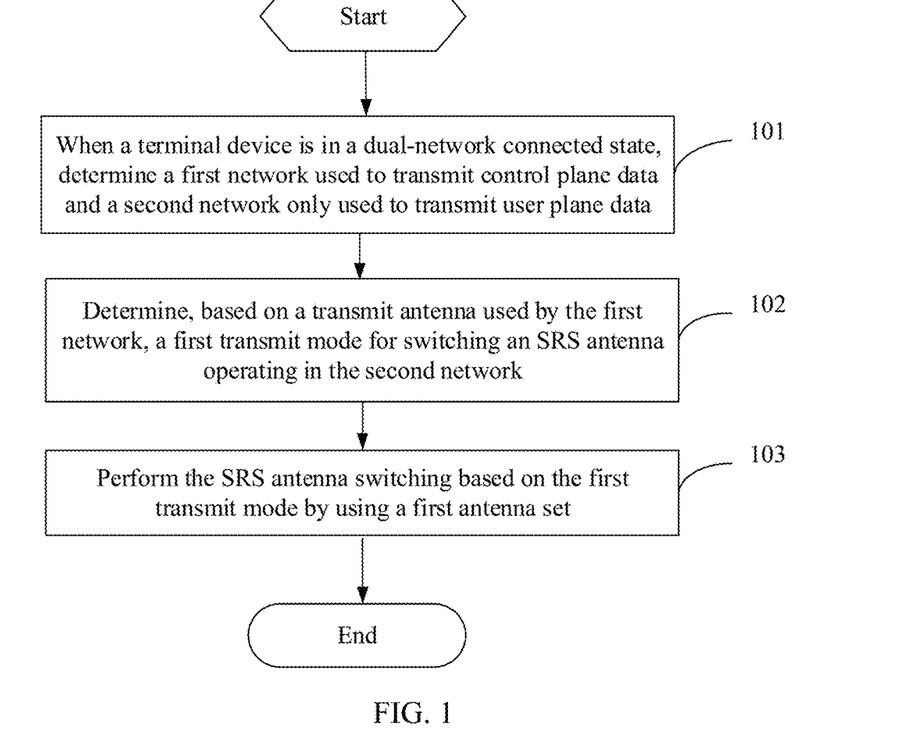
FIG. 1 is a first flowchart of a transmit antenna switching method according to an embodiment of the present disclosure.

Referring to FIG. 1, FIG. 1 is a first flowchart of a transmit antenna switching method according to an embodiment of the present disclosure. As shown in FIG. 1, this embodiment of the present disclosure provides a transmit antenna switching method, applied to a terminal device and including the following steps:

Step 101: When the terminal device is in a dual-network connected state, determine a first network used to transmit control plane data and a second network only used to transmit user plane data, where the dual-network connected state is that the terminal device is simultaneously connected to the first network and the second network.

The terminal device is simultaneously connected to the first network and the second network, the first network is configured to transmit the control plane data, the control plane data is used to ensure a stable connection between the terminal device and a base station, and the first network is further configured to transmit the user plane data. The second network is only used to transmit the user plane data. For example, the first network is an LTE network, and the second network is an NR network.

This embodiment may be applied to a network architecture option 3/3A/3X in an NSA mode. In this network architecture option, the control plane data and the user plane data are transmitted between the terminal device and the LTE network (that is, the first network), and only the user plane data is transmitted between the terminal device and the NR network (that is, the second network).

Step 102: Determine, based on a transmit antenna used by the first network, a first transmit mode for switching a sounding reference signal SRS antenna operating in the second network.

When the terminal device receives an SRS switching request, the terminal device needs to perform the SRS antenna switching. The SRS antenna switching is performed to enable the base station to learn channel quality of an antenna (specifically, a transmit antenna supporting the second network) of the terminal device. When the SRS antenna switching is performed, all switched antennas send SRSs to the base station. When the SRS antenna switching is performed, performance of a receive antenna (receive and transmit co-frequency) of the second network is obtained through SRS switching by using the transmit antenna of the second network. That is, channel quality of the receive antenna of the second network is obtained by using the transmit antenna of the second network. The first transmit mode is used to indicate information related to the SRS antenna switching in the second network. For example, the first transmit mode may indicate whether the second network supports the SRS antenna switching, and a mode of the SRS antenna switching supported by the second network, such as 1T (transmit) 4R (receive) SRS antenna switching, or 1T2R SRS antenna switching. The first transmit mode includes a quantity of antennas for the SRS antenna switching.

After determining the first transmit mode, the terminal device sends, to the base station, information used to indicate the first transmit mode, to notify the base station of an SRS antenna switching capability of the terminal device, and may determine the SRS antenna switching capability based on the first transmit mode.

Step 103: Perform the SRS antenna switching based on the first transmit mode by using a first antenna set, where the first antenna set is all antennas used for the dual-network connected state included in the terminal device except the transmit antenna used by the first network.

The SRS antenna switching is performed based on the first transmit mode by using the first antenna set. Because the first antenna set does not include the transmit antenna used by the first network, when the SRS antenna rotation is switched, switching of an antenna in the first antenna set does not affect the transmit antenna that is being used by the first network, thereby effectively avoiding an antenna resource contention conflict caused by the first network and the second network in a transmit antenna switching process, and improving communication quality.

In this embodiment of the present disclosure, the terminal device may be a mobile phone, a tablet personal computer (Tablet Personal Computer), a laptop computer (Laptop Computer), a personal digital assistant (PDA), a mobile Internet device (MID), a wearable device (Wearable Device), or the like.

According to the transmit antenna switching method provided in this embodiment of the present disclosure, when the terminal device is in the dual-network connected state, the first network used to transmit the control plane data and the second network only used to transmit the user plane data are determined, where the dual-network connected state is that the terminal device is simultaneously connected to the first network and the second network; it is determined, based on the transmit antenna used by the first network, the first transmit mode for switching the SRS antenna operating in the second network; and the SRS antenna switching is performed based on the first transmit mode by using the first antenna set, where the first antenna set is all the antennas used for the dual-network connected state included in the terminal device except the transmit antenna used by the first network. In this way, the first transmit mode of the second network is determined based on the transmit antenna used by the first network, and then the SRS antenna rolling is performed based on the first transmit mode, to avoid affecting the transmit antenna that is being used by the first network when the SRS antenna switching is performed, thereby avoiding an antenna resource contention conflict caused by the first network and the second network in a transmit antenna switching process, and improving communication quality.

Further, the determining, based on a transmit antenna used by the first network, a first transmit mode for switching a sounding reference signal SRS antenna operating in the second network includes:

determining, based on the transmit antenna used by the first network, the first antenna set used for the SRS antenna switching of the terminal device; and determining, based on the first antenna set, the first transmit mode for the SRS antenna switching of the terminal device, where the first transmit mode includes a quantity of antennas for the SRS antenna switching.

Specifically, an antenna in the first antenna set, that is, an antenna that can be used during the SRS antenna switching in the second network, and the first transmit mode for the SRS antenna switching is determined based on antenna information in the first antenna set. The antenna information includes whether an antenna can be used as a transmit antenna of the second network.

For example, the terminal device includes five antennas: ANT0, ANT1, ANT2, ANT3, and ANT4. ANT0 supports the LTE band (that is, ANT0 is a transmit antenna used for the first network), ANT1 supports the NR band (that is, ANT1 is a transmit antenna used for the second network), and ANT2/ANT3/ANT4 supports both the LTE band and the NR band (that is, ANT2/ANT3/ANT4 may be a transmit antenna used for the first network and may also be a transmit antenna used for the second network).

When ANT0 is selected as a transmit antenna on the LTE band, the first antenna set includes ANT1, ANT2, ANT3, and ANT4. The NR band may use ANT1, ANT2, ANT3, or ANT4 for transmission. In this case, the terminal device may implement 1T4R SRS antenna switching on the NR band, and the first transmit mode indicates that the quantity of antennas for the SRS antenna switching is 4.

However, not all antennas in the first antenna set may be used for the SRS antenna switching. The determining, based on the first antenna set, the first transmit mode for the SRS antenna switching of the terminal device is specifically: determining the first transmit mode for the SRS antenna switching of the terminal device based on a quantity of antennas that can be used for the SRS antenna switching in the first antenna set.

When ANT2 is selected as a transmit antenna on the LTE band, the first antenna set includes ANT0, ANT1, ANT3, and ANT4. Because the NR frequency band cannot use ANT0 for transmission, antennas that can be used for the SRS antenna switching in the first antenna set include only ANT1, ANT3, and ANT4. According to a 3GPP protocol requirement, only 1T2R SRS antenna switching can be implemented on the NR band at most. In this case, the first transmit mode indicates that the quantity of antennas for the SRS antenna switching is 2.

Figure 2:
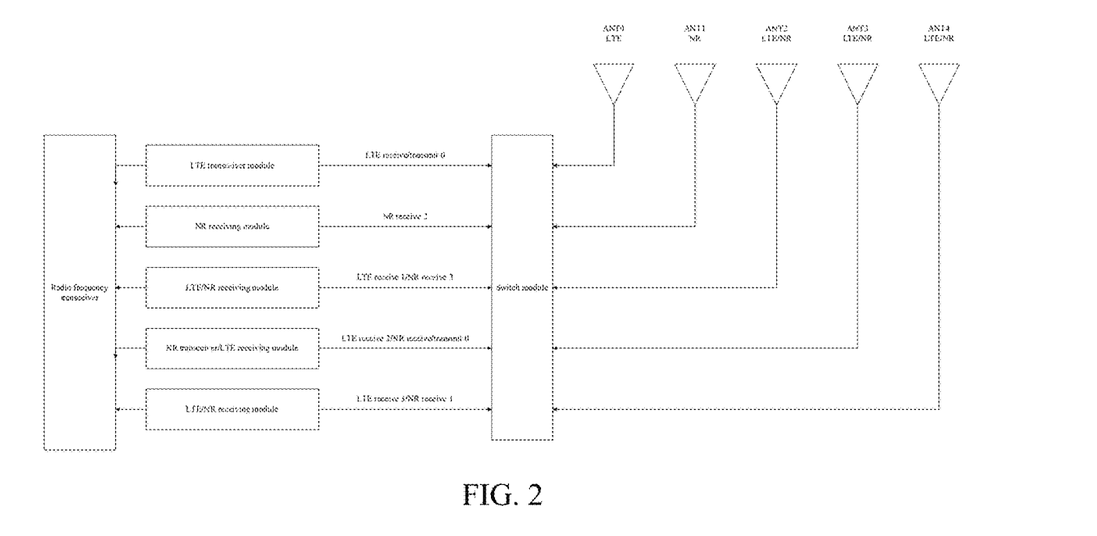
FIG. 2 is a schematic structural diagram of a transmit antenna in an NSA mode according to an embodiment of the present disclosure.

FIG. 2 is a hardware design architecture in an NSA mode according to an embodiment of the present disclosure. As shown in FIG. 2, the architecture includes a radio frequency transceiver, a radio frequency front-end module, a switch module, and an antenna.

The antenna includes five antennas: ANT0, ANT1, ANT2, ANT3, and ANT4. ANT0 supports an LTE band, ANT1 supports an NR band, and ANT2/ANT3/ANT4 supports both the LTE band and the NR band.

The switch module has five input channels and five output channels, that is, LTE receive/transmit 0, NR receive 2, LTE receive 1/NR receive 3, LTE receive 2/NR receive/transmit 0, and LTE receive 3/NR receive 1, which may be separately connected to ANT0, ANT1, ANT2, ANT3, and ANT4 by using the switch module.

When LTE receive/transmit 0 selects to connect to ANT0, transmission on the NR band may be switched between ANT1, ANT2, ANT3, and ANT4, that is, 1T4R SRS antenna switching on the NR band may be implemented.

When LTE receive/transmit 0 selects to connect to ANT2, because LTE has a higher priority than NR, transmission on the NR band can only be switched between ANT1, ANT3, and ANT4. According to a 3GPP protocol requirement, only 1T2R SRS antenna switching can be implemented on the NR band at most, that is, SRS antenna switching is performed between any two antennas in ANT1, ANT3, and ANT4.

When different transmit antennas are used on the LTE band of the terminal device, the NR band may have different SRS antenna switching capabilities. That is, the terminal device may determine the SRS antenna switching capability of the NR band based on the transmit antenna used on the LTE band, to avoid affecting the transmit antenna being used by the first network when the SRS antenna switching is performed. The SRS antenna switching capability may be reflected by a quantity of transmit antennas used for the SRS antenna switching. If the quantity of transmit antennas used for the SRS antenna switching is larger, the SRS antenna switching capability is stronger.

In this embodiment, when it is determined, based on the transmit antenna used by the first network, the first transmit mode for switching the sounding reference signal SRS antenna operating in the second network, specifically, it is determined, based on the transmit antenna used by the first network, the first antenna set used for the SRS antenna switching of the terminal device; and it is determined, based on the first antenna set, the first transmit mode for the SRS antenna switching of the terminal device, where the first transmit mode includes the quantity of antennas for the SRS antenna switching. In this way, the transmit mode for the SRS antenna rolling in the second network can be determined based on the transmit antenna used by the first network, to avoid affecting the transmit antenna that is being used by the first network when the SRS antenna switching is performed, thereby avoiding an antenna resource contention conflict caused by the first network and the second network in a transmit antenna switching process, and improving communication quality.

Further, the performing the SRS antenna switching based on the first transmit mode by using a first antenna set includes:

selecting, based on a quantity N of antennas included in the first transmit mode, N antennas from the first antenna set to perform the SRS antenna switching, where N is an integer greater than or equal to 2.

Specifically, the quantity N of antennas included in the first transmit mode is less than or equal to a quantity of antennas in the first antenna set. For example, the terminal device includes five antennas: ANT0, ANT1, ANT2, ANT3, and ANT4. ANT0 supports the LTE band (that is, ANT0 is a transmit antenna used for the first network), ANT1 supports the NR band (that is, ANT1 is a transmit antenna used for the second network), and ANT2/ANT3/ANT4 supports both the LTE band and the NR band (that is, ANT2/ANT3/ANT4 may be a transmit antenna used for the first network and may also be a transmit antenna used for the second network).

When ANT0 is selected as a transmit antenna on the LTE band, the first antenna set includes ANT1, ANT2, ANT3, and ANT4. The NR band may use ANT1, ANT2, ANT3, or ANT4 for transmission. In this case, the terminal device may implement 1T4R SRS antenna switching on the NR band, and the first transmit mode indicates that the quantity of antennas for the SRS antenna switching is 4, and the quantity N of antennas indicated by the first transmit mode is equal to the quantity of antennas in the first antenna set. The terminal device may switch between ANT1, ANT2, ANT3, and ANT4 to implement the SRS antenna switching.

When ANT2 is selected as a transmit antenna on the LTE band, the first antenna set includes ANT0, ANT1, ANT3, and ANT4. Because the NR frequency band cannot use ANT0 for transmission, antennas that can be used for the SRS antenna switching in the first antenna set include only ANT1, ANT3, and ANT4. According to a 3GPP protocol requirement, only 1T2R SRS antenna switching can be implemented on the NR band at most. In this case, the first transmit mode indicates that the quantity of antennas for the SRS antenna switching is 2, and the quantity N of antennas indicated by the first transmit mode is less than the quantity of antennas in the first antenna set. The terminal device may select any two of ANT1, ANT3, and ANT4 to perform transmission, so as to implement the SRS antenna switching.

In this embodiment, when the SRS antenna switching is performed based on the first transmit mode by using the first antenna set, N antennas are specifically selected from the first antenna set to perform the SRS antenna switching based on the quantity N of antennas included in the first transmit mode, where N is an integer greater than or equal to 2. In this way, the transmit mode for the SRS antenna rolling in the second network can be determined based on the transmit antenna used by the first network, to avoid affecting the transmit antenna that is being used by the first network when the SRS antenna switching is performed, thereby avoiding an antenna resource contention conflict caused by the first network and the second network in a transmit antenna switching process, and improving communication quality.

Further, in an embodiment, after the performing the SRS antenna switching based on the first transmit mode by using a first antenna set in step 103, the method further includes:

Step 104: In a case that a communication performance parameter of a transmit antenna used by the first network to transmit the control plane data is less than a preset parameter threshold, switch the transmit antenna used by the first network to a first antenna, where the first antenna is one of all the antennas used for the dual-network connected state included in the terminal device except the transmit antenna used before the first network is switched.

Specifically, when the communication performance parameter of the transmit antenna currently used by the first network to transmit the control plane data is less than the preset parameter threshold, it indicates that a connection between the terminal device and the base station is unstable, and the terminal device switches the transmit antenna currently used by the first network to the first antenna, to ensure a stable connection between the terminal device and the base station. The communication parameter may be a transmission rate or signal quality. When performing the transmit antenna switching, the first network may switch the currently used antenna to any antenna of the terminal device. That is, when performing the transmit antenna switching, a switching priority of the first network is greater than a switching priority of the second network, and the first network may switch the transmit antenna to a transmit antenna that is being used by the second network.

Figure 3:
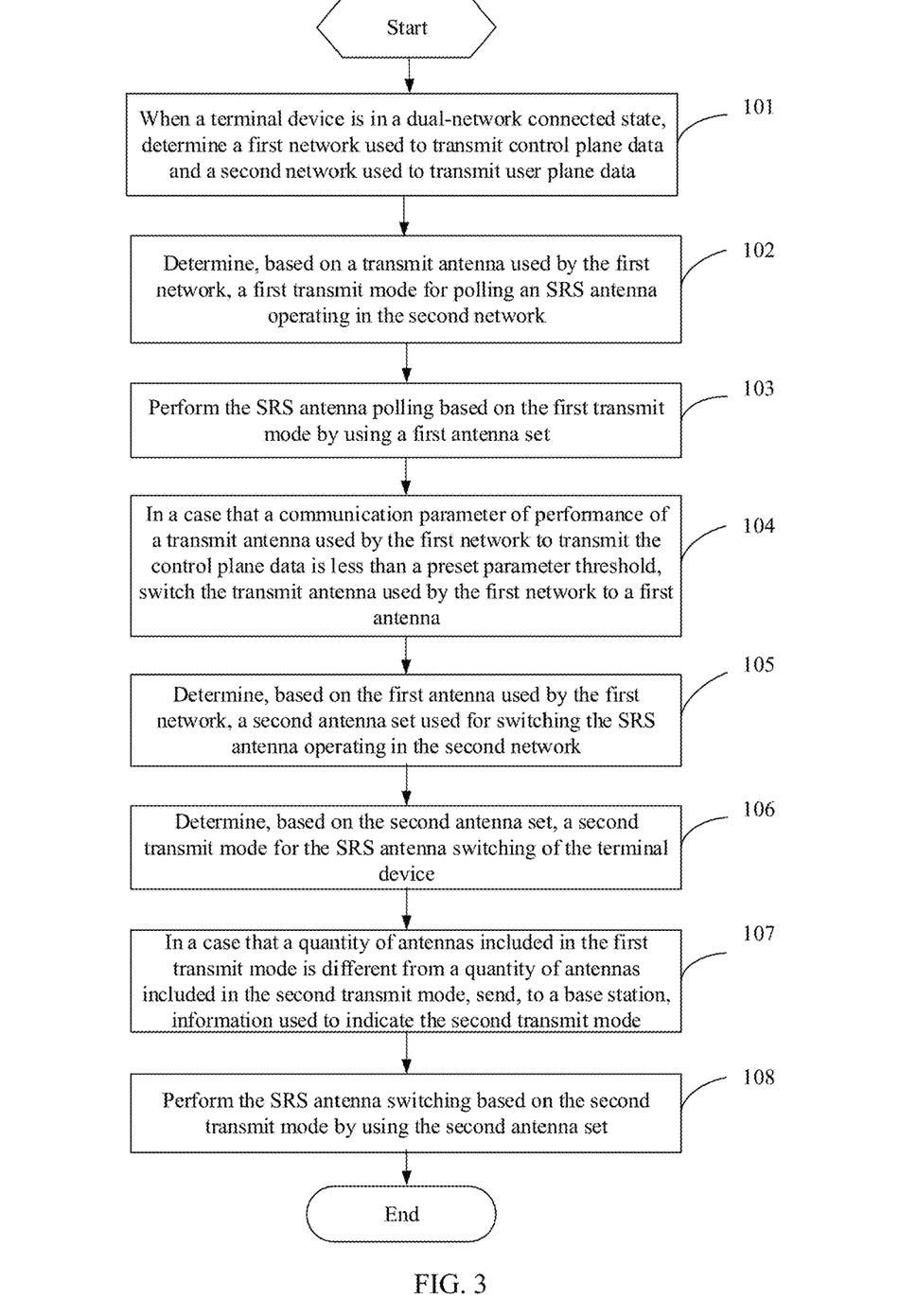
FIG. 3 is a second flowchart of a transmit antenna switching method according to an embodiment of the present disclosure.

Further, as shown in FIG. 3, after the switching the transmit antenna used by the first network to a first antenna, the method further includes:

Step 105: Determine, based on the first antenna used by the first network, a second antenna set used for switching the SRS antenna operating in the second network, where the second antenna set is all the antennas used for the dual-network connected state included in the terminal device except the first antenna.

After the first network switches the transmit antenna to the first antenna, antennas that can be used for performing the SRS antenna switching in the second network needs to be determined again. In this step, the second antenna set used for switching the SRS antenna operating in the second network is determined based on the first antenna used by the first network.

Step 106: Determine, based on the second antenna set, a second transmit mode for the SRS antenna switching of the terminal device, where the second transmit mode includes a quantity of antennas for the SRS antenna switching.

In this step, the second transmit mode for the SRS antenna switching of the terminal device is determined based on the quantity of antennas in the second antenna set, where the second transmit mode includes a quantity of antennas for the SRS antenna switching. The quantity of antennas included in the second transmit mode is less than or equal to the quantity of antennas in the second antenna set.

Step 107: In a case that a quantity of antennas included in the first transmit mode is different from a quantity of antennas included in the second transmit mode, send, to a base station, information used to indicate the second transmit mode.

When the quantity of antennas that are used by the terminal device to perform the SRS antenna switching changes, the terminal device sends, to the base station, the information used to indicate the second transmit mode, to notify the base station of the SRS antenna switching capability of the terminal device, so that the base station can perform data communication during the SRS antenna switching of the terminal device based on the second transmit mode.

Step 108: Perform the SRS antenna switching based on the second transmit mode by using the second antenna set.

The terminal device performs the SRS antenna switching based on the second transmit mode, to avoid affecting the transmit antenna that is being used by the first network when the SRS antenna switching is performed, thereby avoiding an antenna resource contention conflict caused by the first network and the second network in a transmit antenna switching process, and improving communication quality.

For example, the terminal device includes five antennas: ANT0, ANT1, ANT2, ANT3, and ANT4. ANT0 supports the LTE band (that is, ANT0 is a transmit antenna used for the first network), ANT1 supports the NR band (that is, ANT1 is a transmit antenna used for the second network), and ANT2/ANT3/ANT4 supports both the LTE band and the NR band (that is, ANT2/ANT3/ANT4 may be a transmit antenna used for the first network and may also be a transmit antenna used for the second network).

If ANT0 is selected as a transmit antenna on the LTE band, the first antenna set includes ANT1, ANT2, ANT3, and ANT4. The NR band may use ANT1, ANT2, ANT3, or ANT4 for transmission. In this case, the terminal device may implement 1T4R SRS antenna switching on the NR band, and the first transmit mode indicates that the quantity of antennas for the SRS antenna switching is 4. In this case, the terminal device can switch between ANT1, ANT2, ANT3, and ANT4 to implement the SRS antenna switching.

Then, if transmit antenna switching is performed on the LTE band, and ANT2 is used as a transmit antenna (that is, ANT2 is the first antenna), the second antenna set includes ANT0, ANT1, ANT3, and ANT4. Because the NR frequency band cannot use ANT0 for transmission, antennas that can be used for the SRS antenna switching in the second antenna set include only ANT1, ANT3, and ANT4. According to a 3GPP protocol requirement, only 1T2R SRS antenna switching can be implemented on the NR band at most. In this case, the second transmit mode indicates that the quantity of antennas for the SRS antenna switching is 2, and the terminal device may select any two of ANT1, ANT3, and ANT4 to perform switching, so as to implement the SRS antenna switching.

When the LTE band and the NR band contend for transmit antenna resources, an SRS antenna switching capability of the NR band can be reduced, to ensure a normal communication requirement of the LTE band. The SRS antenna switching capability may be reflected by a quantity of transmit antennas used for the SRS antenna switching. If the quantity of transmit antennas used for the SRS antenna switching is large, the SRS antenna switching capability is strong. If the quantity of transmit antennas used for the SRS antenna switching is small, the SRS antenna switching capability is weak.

In this embodiment, in a case that the communication performance parameter of the transmit antenna used by the first network to transmit the control plane data is less than the preset parameter threshold, after the transmit antenna currently used by the first network is switched to the first antenna, it is determined, based on the first antenna used by the first network, the second antenna set used for switching the SRS antenna operating in the second network; it is determined, based on the second antenna set, the second transmit mode for the SRS antenna switching of the terminal device; in a case that the quantity of antennas included in the first transmit mode is different from the quantity of antennas included in the second transmit mode, the information used to indicate the second transmit mode is sent to the base station; and the SRS antenna switching is performed based on the second transmit mode by using the second antenna set. In this way, after the first network performs the transmit antenna switching, the terminal device re-determines, based on the transmit antenna used by the first network, a transmit mode for the SRS antenna switching in the second network, and performs the SRS antenna switching based on the newly determined transmit mode, to avoid affecting the transmit antenna used by the first network when the SRS antenna switching is performed, thereby avoiding an antenna resource contention conflict caused by the first network and the second network in a transmit antenna switching process, and improving communication quality.

Figure 4:
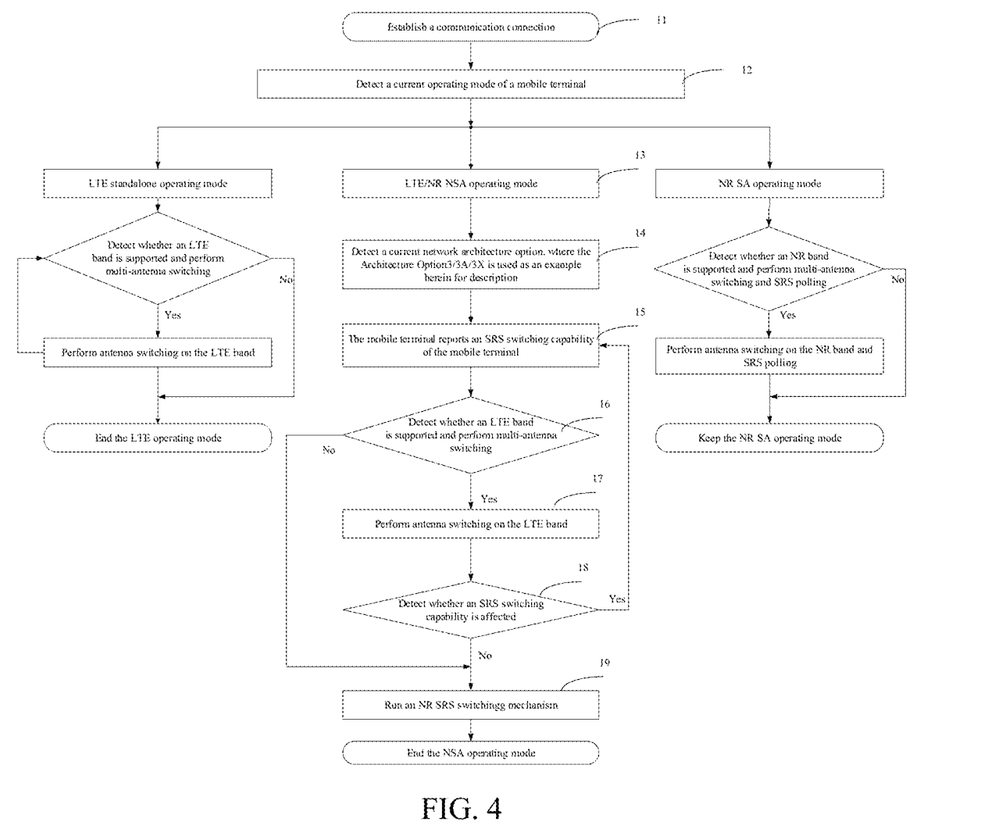
FIG. 4 is a third flowchart of a transmit antenna switching method according to an embodiment of the present disclosure.

As shown in FIG. 4, an antenna switching procedure of a terminal device is as follows:

Step 11: Establish a communication connection to a base station.

Step 12: Detect whether the terminal device operates in a dual-network mode of an LTE network and an NR network.

Step 13: The terminal device operates in an NSA mode.

Step 14: Detect a network architecture option in the current NSA mode, where the network architecture is Option3/3A/3X.

Step 15: The terminal device reports an SRS antenna switching capability of the terminal device to the base station, where the SRS antenna switching capability is determined based on a transmit antenna currently used by the LTE network.

Step 16: If it is detected that the LTE band is supported and transmit antenna switching needs to be performed, perform step 17; otherwise, perform step 19.

Step 17: Perform transmit antenna switching on the LTE band.

Step 18: Determine whether the SRS antenna switching capability changes in this case, where the SRS switching rotation capability is determined based on a transmit antenna after the LTE network is switched, and if any change occurs, perform step 15; or if no change occurs, perform step 19.

Step 19: Perform SRS antenna switching.

Figure 5:
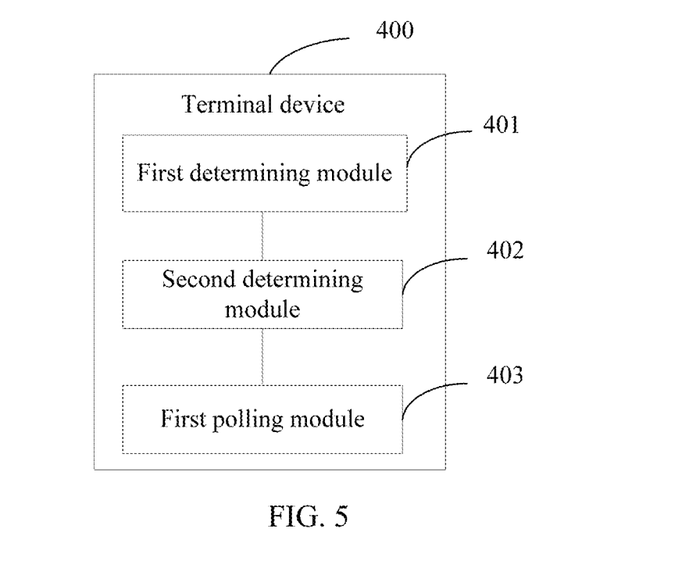
FIG. 5 is a structural diagram of a terminal device according to an embodiment of the present disclosure.

Referring to FIG. 5, FIG. 5 is a structural diagram of a terminal device according to an embodiment of the present disclosure. As shown in FIG. 5, this embodiment provides a terminal device 400, including:

a first determining module 401, configured to: when the terminal device is in a dual-network connected state, determine a first network used to transmit control plane data and a second network only used to transmit user plane data;

a second determining module 402, configured to determine, based on a transmit antenna used by the first network, a first transmit mode for switching a sounding reference signal SRS antenna operating in the second network; and a first switching module 403, configured to perform the SRS antenna switching based on the first transmit mode by using a first antenna set, where the dual-network connected state is that the terminal device is simultaneously connected to the first network and the second network;

the first transmit mode includes a quantity of antennas for performing the SRS antenna switching in the second network; and the first antenna set is all antennas used for the dual-network connected state included in the terminal device except the transmit antenna used by the first network.

Further, the second determining module 402 includes:

a first determining submodule, configured to determine, based on the transmit antenna used by the first network, the first antenna set used for the SRS antenna switching of the terminal device; and a second determining submodule, configured to determine, based on the first antenna set, the first transmit mode for the SRS antenna switching of the terminal device.

Further, the first switching module 403 is configured to:

select, based on a quantity N of antennas indicated by the first transmit mode, N antennas from the first antenna set to perform the SRS antenna switching, where N is an integer greater than or equal to 2.

Further, the terminal device 400 further includes:

a switching module, configured to: in a case that a communication performance parameter of a transmit antenna used by the first network to transmit the control plane data is less than a preset parameter threshold, switch the transmit antenna currently used by the first network to a first antenna, where the first antenna is one of all the antennas used for the dual-network connected state included in the terminal device except the transmit antenna used before the first network is switched.

Further, the terminal device 400 further includes:

a third determining module, configured to determine, based on the first antenna used by the first network, a second antenna set used for switching the SRS antenna operating in the second network, where the second antenna set is all the antennas used for the dual-network connected state included in the terminal device except the first antenna;

a fourth determining module, configured to determine, based on the second antenna set, a second transmit mode for the SRS antenna switching of the terminal device;

a sending module, configured to: in a case that a quantity of antennas included in the first transmit mode is different from a quantity of antennas included in the second transmit mode, send, to a base station, information used to indicate the second transmit mode; and a second switching module, configured to perform the SRS antenna switching based on the second transmit mode by using the second antenna set.

The terminal device 400 can implement each process implemented by the terminal device in the method embodiments shown in FIG. 1 to FIG. 2. To avoid repetition, details are not described herein again.

According to the terminal device 400 in this embodiment of the present disclosure, when the terminal device is in the dual-network connected state, the first network used to transmit the control plane data and the second network only used to transmit the user plane data are determined, where the dual-network connected state is that the terminal device is simultaneously connected to the first network and the second network; it is determined, based on the transmit antenna used by the first network, the first transmit mode for switching the SRS antenna operating in the second network; and the SRS antenna switching is performed based on the first transmit mode by using the first antenna set, where the first antenna set is all the antennas used for the dual-network connected state included in the terminal device except the transmit antenna used by the first network. In this way, the first transmit mode of the second network is determined based on the transmit antenna used by the first network, and then the SRS antenna rolling is performed based on the first transmit mode, to avoid affecting the transmit antenna that is being used by the first network when the SRS antenna switching is performed, thereby avoiding an antenna resource contention conflict caused by the first network and the second network in a transmit antenna switching process, and improving communication quality.

Figure 6:
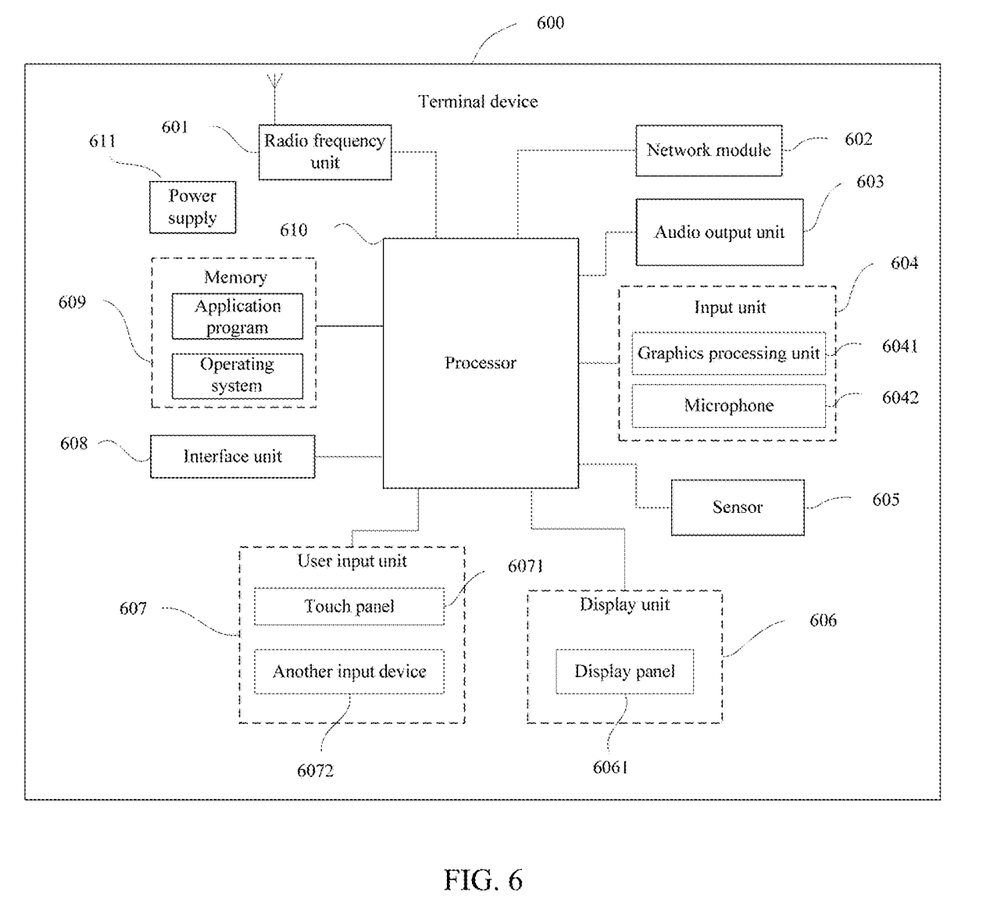
FIG. 6 is a structural diagram of a terminal device according to another embodiment of the present disclosure.

FIG. 6 is a schematic diagram of a hardware structure of a terminal device implementing the various embodiments of the present disclosure. As shown in FIG. 6, the terminal device 600 includes, but not limited to: a radio frequency unit 601, a network module 602, an audio output unit 603, an input unit 604, a sensor 605, a display unit 606, a user input unit 607, an interface unit 608, a memory 609, a processor 610, a power supply 611, and the like. A person skilled in the art may understand that the structure of the terminal device shown in FIG. 6 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, an in-vehicle terminal, a wearable device, a pedometer, and the like.

The processor 610 is configured to: when the terminal device is in a dual-network connected state, determine a first network used to transmit control plane data and a second network only used to transmit user plane data;

determine, based on a transmit antenna used by the first network, a first transmit mode for switching a sounding reference signal SRS antenna operating in the second network; and perform the SRS antenna switching based on the first transmit mode by using a first antenna set, where the dual-network connected state is that the terminal device is simultaneously connected to the first network and the second network;

the first transmit mode includes a quantity of antennas for performing the SRS antenna switching in the second network; and the first antenna set is all antennas used for the dual-network connected state included in the terminal device except the transmit antenna used by the first network.

Further, the processor 610 is further configured to:

determine, based on the transmit antenna used by the first network, the first antenna set used for the SRS antenna switching of the terminal device; and determine, based on the first antenna set, the first transmit mode for the SRS antenna switching of the terminal device.

Further, the processor 610 is further configured to:

select, based on a quantity N of antennas indicated by the first transmit mode, N antennas from the first antenna set to perform the SRS antenna switching, where N is an integer greater than or equal to 2.

Further, the processor 610 is further configured to:

in a case that a communication performance parameter of a transmit antenna used by the first network to transmit the control plane data is less than a preset parameter threshold, switch the transmit antenna used by the first network to a first antenna, where the first antenna is one of all the antennas used for the dual-network connected state included in the terminal device except the transmit antenna used before the first network is switched.

Further, the processor 610 is further configured to:

determine, based on the first antenna used by the first network, a second antenna set used for switching the SRS antenna operating in the second network, where the second antenna set is all the antennas used for the dual-network connected state included in the terminal device except the first antenna;

determine, based on the second antenna set, a second transmit mode for the SRS antenna switching of the terminal device;

in a case that a quantity of antennas indicated by the first transmit mode is different from a quantity of antennas indicated by the second transmit mode, send, to a base station, information used to indicate the second transmit mode; and perform the SRS antenna switching based on the second transmit mode by using the second antenna set.

The terminal device 600 can implement each process implemented by the terminal device in the foregoing embodiment. To avoid repetition, details are not described herein again.

According to the terminal device 600 in this embodiment of the present disclosure, when the terminal device is in the dual-network connected state, the first network used to transmit the control plane data and the second network only used to transmit the user plane data are determined, where the dual-network connected state is that the terminal device is simultaneously connected to the first network and the second network; it is determined, based on the transmit antenna used by the first network, the first transmit mode for switching the SRS antenna operating in the second network; and the SRS antenna switching is performed based on the first transmit mode by using the first antenna set, where the first antenna set is all the antennas used for the dual-network connected state included in the terminal device except the transmit antenna used by the first network. In this way, the first transmit mode of the second network is determined based on the transmit antenna used by the first network, and then the SRS antenna rolling is performed based on the first transmit mode, to avoid affecting the transmit antenna that is being used by the first network when the SRS antenna switching is performed, thereby avoiding an antenna resource contention conflict caused by the first network and the second network in a transmit antenna switching process, and improving communication quality.

It should be understood that, in this embodiment of the present disclosure, the radio frequency unit 601 may be configured to receive and send information or a signal in a call process. Specifically, after receiving downlink data from a base station, the radio frequency unit 601 sends the downlink data to the processor 610 for processing. In addition, the radio frequency unit 601 sends uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The terminal device provides a user with wireless broadband Internet access through the network module 602, for example, helps the user send and receive emails, browse web pages, and access streaming media.

The audio output unit 603 may convert audio data transmitted by the radio frequency unit 601 or the network module 602 or stored in the memory 609 into an audio signal and output the audio signal as a sound. In addition, the audio output unit 603 may further provide an audio output (for example, a call signal transmission voice, or a message transmission voice) related to a specific function implemented by the terminal device 600. The audio output unit 603 includes a speaker, a buzzer, a telephone receiver, and the like.

The input unit 604 is configured to transmit an audio signal or a video signal. The input unit 604 may include a graphics processing unit (GPU) 6041 and a microphone 6042. The graphics processing unit 6041 processes image data of a static picture or a video obtained by an image capturing apparatus (for example, a camera) in video capturing mode or image capturing mode. A processed image frame can be displayed on the display unit 606. The image frame processed by the graphics processing unit 6041 may be stored in the memory 609 (or another storage medium) or transmit by using the radio frequency unit 601 or the network module 602. The microphone 6042 may transmit a sound and can process such sound into audio data. Processed audio data may be converted, in a call mode, into a format that can be transmit to a mobile communication base station by using the radio frequency unit 601 for output.

The terminal device 600 further includes at least one sensor 605, for example, an optical sensor, a motion sensor, and other sensors. Specifically, the light sensor includes an ambient light sensor and a proximity sensor. The ambient light sensor may adjust luminance of the display panel 6061 based on brightness of ambient light. The proximity sensor may turn off the display panel 6061 and/or backlight when the terminal device 600 moves to an ear. As a type of the motion sensor, an accelerometer sensor may detect an acceleration value in each direction (generally, three axes), and detect a value and a direction of gravity when the accelerometer sensor is static, and may be used in an application program for recognizing a posture of the terminal device (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for a user. The display unit 606 may include the display panel 6061, and the display panel 6061 may be configured in a form of a liquid crystal display (LCD), an organic light-emitting diode (OLED), or the like.

The user input unit 607 may be configured to transmit input digit or character information, and generate a key signal input related to a user setting and function control of the terminal device. Specifically, the user input unit 607 includes a touch panel 6071 and another input device 6072. The touch panel 6071 is also referred to as a touchscreen, and may collect a touch operation performed by a user on or near the touch panel 6071 (such as an operation performed by a user on the touch panel 6071 or near the touch panel 6071 by using any proper object or accessory, such as a finger or a stylus). The touch panel 6071 may include two parts: a touch detection apparatus and a touch controller. The touch detection apparatus detects a touch position of the user, detects a signal brought by the touch operation, and sends the signal to the touch controller. The touch controller transmits touch information from the touch detection apparatus, converts the touch information into touch point coordinates, sends the touch point coordinates to the processor 610, and transmits and executes a command sent by the processor 610. In addition, the touch panel 6071 may be of a resistive type, a capacitive type, an infrared type, a surface acoustic wave type, or the like. The user input unit 607 may include the another input device 6072 in addition to the touch panel 6071. Specifically, the another input device 6072 may include but is not limited to a physical keyboard, a function key (such as a volume control key or a power on/off key), a trackball, a mouse, a joystick, and the like. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. In FIG. 6, although the touch panel 6071 and the display panel 6061 are used as two independent parts to implement input and output functions of the terminal device, in some embodiments, the touch panel 6071 and the display panel 6061 may be integrated to implement the input and output functions of the terminal device. This is not specifically limited herein.

The interface unit 608 is an interface for connecting an external apparatus with the terminal device 600. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 608 may be configured to receive input (for example, data information and power) from an external apparatus and transmit the received input to one or more elements in the terminal device 600 or may be configured to transmit data between the terminal device 600 and an external apparatus.

The memory 609 may be configured to store a software program and various data. The memory 609 may mainly include a program storage area and a data storage area. The program storage area may store an operating system, an application program required by at least one function (for example, a sound playback function and an image playback function), and the like. The data storage area may store data (for example, audio data and an address book) created based on the use of the mobile phone, and the like. In addition, the memory 609 may include a high-speed random access memory, and may further include a nonvolatile memory, for example, at least one magnetic disk storage device, a flash storage device, or another volatile solid-state storage device.

The processor 610 is a control center of the terminal device, connects various parts of the entire terminal device by using various interfaces and circuits, and performs various functions of the terminal device and processes data by running or executing the software programs and/or the modules stored in the memory 609 and invoking data stored in the memory 609, so as to monitor the terminal device as a whole. The processor 610 may include one or more processing units. Optionally, the processor 610 may be integrated with an application processor and a modem processor. The application processor mainly processes the operating system, the user interface, application programs, and the like. The modem processor mainly processes wireless communication. It can be understood that, alternatively, the modem processor may not be integrated into the processor 610.

The terminal device 600 may further include the power supply 611 (such as a battery) that supplies power to each component. Optionally, the power supply 611 may be logically connected to the processor 610 by using a power management system, to implement functions such as charging, discharging, and power consumption management by using the power management system.

In addition, the terminal device 600 includes some functional modules that are not shown. Details are not described herein.

Optionally, an embodiment of the present disclosure further provides a terminal device, including a processor 610, a memory 609, and a computer program that is stored in the memory 609 and that can be run by the processor 610. When the processor 610 executes the computer program, the processes of the foregoing transmit antenna switching method embodiment are implemented and a same technical effect can be achieved. To avoid repetition, details are not described herein again.

An embodiment of the present disclosure further provides a computer-readable storage medium. The computer-readable storage medium stores a computer program, and when a processor executes the computer program, the processes of the foregoing transmit antenna switching method embodiment are implemented and a same technical effect can be achieved. To avoid repetition, details are not described herein again. The computer readable storage medium may be a read-only memory (ROM), a random access memory (RAM), a magnetic disk, a compact disc, or the like.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. Without being subject to further limitations, an element defined by a phrase "including a . . . " does not exclude presence of other identical elements in the process, method, article, or apparatus that includes the very element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely examples instead of restrictions. With enlightenment because of the present disclosure, a person of ordinary skills in the art may make many forms without departing from the aim of the present disclosure and the protection scope of the claims, all of which fall within the protection of the present disclosure.

The invention claimed is:

1. A transmit antenna switching method, applied to a terminal device and comprising:
   when the terminal device is in a dual-network connected state, determining a first network used to transmit control plane data and a second network only used to transmit user plane data;
   determining, based on a transmit antenna used by the first network, a first transmit mode for switching a sounding reference signal SRS antenna operating in the second network; and
   performing the SRS antenna switching based on the first transmit mode by using a first antenna set, wherein
   the dual-network connected state is that the terminal device is simultaneously connected to the first network and the second network;
   the first transmit mode comprises a quantity of antennas for performing the SRS antenna switching in the second network; and
   the first antenna set is all antennas used for the dual-network connected state comprised in the terminal device except the transmit antenna used by the first network.

2. The method according to claim 1, wherein the determining, based on a transmit antenna used by the first network, a first transmit mode for switching a sounding reference signal SRS antenna operating in the second network comprises:
   determining, based on the transmit antenna used by the first network, the first antenna set used for the SRS antenna switching of the terminal device; and
   determining, based on the first antenna set, the first transmit mode for the SRS antenna switching of the terminal device.

3. The method according to claim 1, wherein the performing the SRS antenna switching based on the first transmit mode by using a first antenna set comprises:
   selecting, based on a quantity N of antennas comprised in the first transmit mode, N antennas from the first antenna set to perform the SRS antenna switching, wherein N is an integer greater than or equal to 2.

4. The method according to claim 2, wherein after the performing the SRS antenna switching based on the first transmit mode by using a first antenna set, the method further comprises:

in a case that a communication performance parameter of a transmit antenna used by the first network to transmit the control plane data is less than a preset parameter threshold, switching the transmit antenna used by the first network to a first antenna, wherein the first antenna is one of all the antennas used for the dual-network connected state comprised in the terminal device except the transmit antenna used before the first network is switched.

5. The method according to claim 4, wherein after the switching the transmit antenna used by the first network to a first antenna, the method further comprises:

determining, based on the first antenna used by the first network, a second antenna set used for switching the SRS antenna operating in the second network, wherein the second antenna set is all the antennas used for the dual-network connected state comprised in the terminal device except the first antenna;

determining, based on the second antenna set, a second transmit mode for the SRS antenna switching of the terminal device;

in a case that a quantity of antennas comprised in the first transmit mode is different from a quantity of antennas comprised in the second transmit mode, sending, to a base station, information used to indicate the second transmit mode; and performing the SRS antenna switching based on the second transmit mode by using the second antenna set.

6. A terminal device, comprising:

a processor;

a memory; and a computer program that is stored in the memory and that can be run by the processor, wherein when the processor executes the computer program, the following steps are implemented:

when the terminal device is in a dual-network connected state, determining a first network used to transmit control plane data and a second network only used to transmit user plane data;

determining, based on a transmit antenna used by the first network, a first transmit mode for switching a sounding reference signal SRS antenna operating in the second network; and performing the SRS antenna switching based on the first transmit mode by using a first antenna set, wherein the dual-network connected state is that the terminal device is simultaneously connected to the first network and the second network;

the first transmit mode comprises a quantity of antennas for performing the SRS antenna switching in the second network; and the first antenna set is all antennas used for the dual-network connected state comprised in the terminal device except the transmit antenna used by the first network.

7. The terminal device according to claim 6, wherein the determining, based on a transmit antenna used by the first network, a first transmit mode for switching a sounding reference signal SRS antenna operating in the second network comprises:

determining, based on the transmit antenna used by the first network, the first antenna set used for the SRS antenna switching of the terminal device; and determining, based on the first antenna set, the first transmit mode for the SRS antenna switching of the terminal device.

8. The terminal device according to claim 7, wherein after the performing the SRS antenna switching based on the first transmit mode by using a first antenna set, the method further comprises:

in a case that a communication performance parameter of a transmit antenna used by the first network to transmit the control plane data is less than a preset parameter threshold, switching the transmit antenna used by the first network to a first antenna, wherein the first antenna is one of all the antennas used for the dual-network connected state comprised in the terminal device except the transmit antenna used before the first network is switched.

9. The terminal device according to claim 8, wherein after the switching the transmit antenna used by the first network to a first antenna, the method further comprises:

determining, based on the first antenna used by the first network, a second antenna set used for switching the SRS antenna operating in the second network, wherein the second antenna set is all the antennas used for the dual-network connected state comprised in the terminal device except the first antenna;

determining, based on the second antenna set, a second transmit mode for the SRS antenna switching of the terminal device;

in a case that a quantity of antennas comprised in the first transmit mode is different from a quantity of antennas comprised in the second transmit mode, sending, to a base station, information used to indicate the second transmit mode; and performing the SRS antenna switching based on the second transmit mode by using the second antenna set.

10. The terminal device according to claim 6, wherein the performing the SRS antenna switching based on the first transmit mode by using a first antenna set comprises:

selecting, based on a quantity N of antennas comprised in the first transmit mode, N antennas from the first antenna set to perform the SRS antenna switching, wherein N is an integer greater than or equal to 2.

11. A non-transitory computer-readable storage medium, wherein the computer-readable storage medium stores a computer program, and when a processor executes the computer program, the following steps are implemented:

when a terminal device is in a dual-network connected state, determining a first network used to transmit control plane data and a second network only used to transmit user plane data;

determining, based on a transmit antenna used by the first network, a first transmit mode for switching a sounding reference signal SRS antenna operating in the second network; and performing the SRS antenna switching based on the first transmit mode by using a first antenna set, wherein the dual-network connected state is that the terminal device is simultaneously connected to the first network and the second network;

the first transmit mode comprises a quantity of antennas for performing the SRS antenna switching in the second network; and the first antenna set is all antennas used for the dual-network connected state comprised in the terminal device except the transmit antenna used by the first network.

12. The non-transitory computer-readable storage medium according to claim 11, wherein when the processor executes the computer program, the following steps are further implemented:

determining, based on the transmit antenna used by the first network, the first antenna set used for the SRS antenna switching of the terminal device; and determining, based on the first antenna set, the first transmit mode for the SRS antenna switching of the terminal device.

13. The non-transitory computer-readable storage medium according to claim 12, wherein after the performing the SRS antenna switching based on the first transmit mode by using a first antenna set, when the processor executes the computer program, the following steps are further implemented:

in a case that a communication performance parameter of a transmit antenna used by the first network to transmit the control plane data is less than a preset parameter threshold, switching the transmit antenna used by the first network to a first antenna, wherein the first antenna is one of all the antennas used for the dual-network connected state comprised in the terminal device except the transmit antenna used before the first network is switched.

14. The non-transitory computer-readable storage medium according to claim 13, wherein after the switching the transmit antenna used by the first network to a first antenna, when the processor executes the computer program, the following steps are further implemented:

determining, based on the first antenna used by the first network, a second antenna set used for switching the SRS antenna operating in the second network, wherein the second antenna set is all the antennas used for the dual-network connected state comprised in the terminal device except the first antenna;

determining, based on the second antenna set, a second transmit mode for the SRS antenna switching of the terminal device;

in a case that a quantity of antennas comprised in the first transmit mode is different from a quantity of antennas comprised in the second transmit mode, sending, to a base station, information used to indicate the second transmit mode; and performing the SRS antenna switching based on the second transmit mode by using the second antenna set.

15. The non-transitory computer-readable storage medium according to claim 11, wherein when the processor executes the computer program, the following steps are further implemented:

selecting, based on a quantity N of antennas comprised in the first transmit mode, N antennas from the first antenna set to perform the SRS antenna switching, wherein N is an integer greater than or equal to 2.

* * * * *